Patented Oct. 13, 1936

2,057,316

UNITED STATES PATENT OFFICE 2,057,316

PROCESS OF PREVENTING INJURY TO FROSTED VEGETATION

Charles H. Rutherford, Phoenix, Ariz.

No Drawing. Application April 27, 1936,
Serial No. 76,699

4 Claims. (Cl. 47—58)

My invention relates to improvements in a process for preventing injury to frosted vegetation, and it consists in the steps hereinafter set forth.

The process is primarily intended for citrus trees and, as indicated, is not designed to prevent frosting of the trees but to prevent injury to trees that have been frosted.

An object of the invention is to provide a process for preventing injury to frosted trees which is particularly effective and which may be carried out by the use of relatively inexpensive materials.

A further object of the invention is to provide a process of the type described in which the treatment is of relatively short duration, thereby affording an economy in cost as well as labor.

A further object is to provide a process which is particularly adapted to orchards located in the vicinity of bodies of water such as lakes, creeks, irrigating ditches, and the like.

Other objects and advantages will appear in the following specification and the novel features of the invention will be particularly pointed out in the appended claims.

In the preferred form of the process I make use of a water spray which is charged with chemical ingredients that tend to revive a frosted tree more quickly than if the spray were not so treated, but it will be understood that in certain instances the prevention of injury may be accomplished by the use of water alone.

In the preferred form of the process I make use of chemical ingredients such as ammonium sulphate, calcium nitrate, and ammonium phosphate. The following is a formula which I have used successfully in preparing this spray:

Ammonium sulphate _____ 50 lbs.
Calcium nitrate _____ 100 lbs.
Ammonium phosphate_____ 50 lbs.
Water approximately _____ 50,000 gallons The water may be obtained from any convenient source such as a lake, creek, irrigation ditch, etc.

Assuming that an orchard has been subjected to a temperature in which the trees are frosted, I make use of a spray which is thrown upon the trees from overhead by any suitable means, this spray having the chemical ingredients above-named. It is important that the spraying be begun a few minutes before sunrise, since I have found that if the sun strikes a frosted tree or plant, it burns and cooks the leaves, buds, and branches.

When the water thus charged strikes the frosted tree it tends to wash off the frost. The water need not be warm, that is to say, it need not be above normal temperature. The chemical constituents aid in the quick revival of the plant from any deleterious effects which may have been occasioned by the frost so that the trees are revived and cured.

The spraying step is continued until such time as the sun has warmed up the orchard, usually until 9 or 10 A. M.

It is essential that the spraying shall be begun before sunrise since if the sun strikes the frosted tree, as stated, the damage will be done and further spraying is ineffective. While the use of water alone will in many cases prevent injury by frost, I have found that the tree revives quicker if the water is treated with chemicals which the plant will naturally assimilate. This is especially true where the plant has the benefit of nitrogen-containing salts, such as those mentioned above.

I claim:

1. The herein described process of preventing injury to frosted vegetation which consists in spraying said vegetation with water before sunrise to wash off the frost.

2. The herein described process of preventing injury to frosted vegetation which consists in spraying said vegetation with water before sunrise to wash off the frost, and continuing the spray after sunrise.

3. The herein described process of preventing injury to frosted vegetation which consists in spraying said vegetation with water charged with soluble compounds of nitrogen, said spraying being begun before sunrise and continued after sunrise.

4. The herein described process of preventing injury to frosted vegetation which consists in spraying said vegetation from overhead with a water solution of a small proportion of soluble salts of nitrogen, said spraying being begun before sunrise and continued after sunrise, whereby the frost is washed off and the plants are supplied with nitrogen compounds capable of being assimilated.

CHARLES H. RUTHERFORD.